(12) United States Patent
Preftitsis et al.

(10) Patent No.: US 8,484,964 B2
(45) Date of Patent: Jul. 16, 2013

(54) WAVE ENERGY COLLECTING DEVICE

(76) Inventors: Georgios Preftitsis, Thessaloniki (GR); Dimitrios Mavrommatakis, Thessaloniki (GR)

( * ) Notice: Subject to any disclaimer, the term of this patent is extended or adjusted under 35 U.S.C. 154(b) by 348 days.

(21) Appl. No.: 12/992,650

(22) PCT Filed: May 13, 2008

(86) PCT No.: PCT/GR2008/000036
§ 371 (c)(1), (2), (4) Date: Nov. 15, 2010

(87) PCT Pub. No.: WO2009/138805
PCT Pub. Date: Nov. 19, 2009

(65) Prior Publication Data
US 2011/0061377 A1    Mar. 17, 2011

(51) Int. Cl.
*F03B 17/02* (2006.01)
(52) U.S. Cl.
USPC .................. 60/495; 60/497; 60/499; 60/500; 60/505
(58) Field of Classification Search
USPC .................. 60/495, 496, 497, 500, 505, 506
See application file for complete search history.

(56) References Cited

U.S. PATENT DOCUMENTS 4,118,932 A    10/1978    Sivill et al.
4,684,815 A     8/1987    Gargos et al.

FOREIGN PATENT DOCUMENTS

WO        00/08334 A    2/2000
WO    2006/006864 A    1/2006

OTHER PUBLICATIONS

International Search Report PCT/GR2008/000036.

*Primary Examiner* — Thomas Denion
*Assistant Examiner* — Philip Eklem (57) ABSTRACT

A wave energy collecting device comprises an array of modules, each including three pairs of buoyant members arranged in a circular configuration, a tubular shaft connector interconnecting each pair of buoyant members, and a trilateral radial plank member comprising three identical equidistantly spaced members located centrally within the circular configuration. Each of the three members of the plank member is linearly connected to a member of the plank member of an adjacent module through a spring assembly and perpendicularly connected with a pivotally hinged shaft of a corresponding tubular shaft connector. A working fluid medium flows within a pipe network lined along sequential members. An array of pumps mounted onto each buoyant member, another array of pumps mounted adjacently each spring assembly and another array of pumps mounted adjacently each shaft, impart wave induced pressure pulses into the working fluid medium, which is subsequently converted into energy.

10 Claims, 14 Drawing Sheets

WAVE ENERGY COLLECTING DEVICE

The invention relates to a multidirectionally extendable wave energy collecting device being built by appropriately assembling a desired plurality of wave energy collecting modules, each module comprising an array of three pairs of buoyant members, each pair of buoyant members interconnected via tubular shaft means and a trilateral radial plank member located centrally in the free space of the three surrounding pairs of buoyant members and connected to the tubular shaft connecting members, wherein an appropriate pipe network is lined along sequential tubular shaft means and trilateral radial plank members, an array of pumps being provided onto the upper surface of each buoyant member, and further arrays of pumps conveniently mounted at the junctions between sequential trilateral radial plank members and at the junctions of such trilateral radial plank members with tubular shaft members, the aforementioned arrays of pumps advantageously exploiting wave induced movement of said buoyant members and elastic relative displacement in said junctions in order to provide a net energy outcome embodied in the working fluid medium circulated through the abovementioned pipe network and pump assembly.

Various wave energy collecting devices are known in the prior art. U.S. Pat. No. 4,098,084 discloses such a device comprising a plurality of buoyant members interconnected one with another so as to be movable relative to one another, each buoyant member being provided with a plate member positioned so as to be submerged below the level of water in use of the device, so that movement of water over the plate members reacts so as to advantageously increase the relative movement of the buoyant members that can be then converted into exploitable energy. WO-2006/006864 on the other hand proposes a multiphased and multidirectional wave converter device comprising buoyant members sequentially connected via rods extending perpendicularly to the longitudinal direction of the buoyant members, each buoyant member being provided with an energy producing, multi-axial pivotal joint to which the rods are attached, the assembly further comprising an energy-producing pivotal toggle joint interconnecting the rods of adjacent buoyant members.

The above cited wave converting devices of the prior art render a restricted wave energy converting capacity since they are primarily extendable in a single linear direction and thereby may only provide an efficient wave energy exploitation under the rare circumstances of the waves being deployed along a specific preferential direction. If buoyant members extend in an interconnected mode in various other directions, the apparatus tends to become unstable, apt to being damaged by the multidirectionally oriented wave forces acting thereupon. By way of example, connection of each buoyant member with six adjacent buoyant members surrounding the same as proposed in one embodiment of U.S. Pat. No. 4,098,084 seriously aggravates destructive forces due to lack of elastically extensible hinges and thereby renders the overall structure non resilient. On the other hand their preferential linear deployment, apart from its low wave energy converting capacity, imposes the requirement of undesirably covering an excessive length of the coast, such excessive length coverage adversely effecting the coast, both functionally and aesthetically. The wave converting devices proposed in U.S. Pat. No. 4,098,084 or WO-2006/006864 further comprise a plurality of varying parts rendering the device rather expensive, whilst, since the overall structure extends substantially above the level of sea surface, it becomes vulnerable to destructive wave forces acting thereupon under adverse weather conditions.

It is therefore an object of the present invention to advantageously overcome the abovementioned drawbacks of the prior art and propose a wave energy collecting device that has a relatively low cost and is being built by means of repeatable modules of wave converting arrays of buoyant members and interconnecting structural members, wherein the device is unlimitedly extendable in any direction whatsoever, advantageously exploiting wave movement and providing a relatively constant energy output independently of the direction of waves, the device thereby occupying a substantially reduced surface area in comparison with the aforementioned linearly extendable devices of the prior art and being of a minimal height above sea surface thereby becoming less vulnerable to destructive wave forces and rendering a minimal functional and aesthetic burden to the sea coast.

It is a further object of the present invention to provide for a remotely controlled immersion of the wave energy collecting device in order to provide safety under adverse weather conditions and/or free the area of the sea occupied by the device for alternate usages, such remotely controlled immersion of the wave energy collecting device being obtained by appropriately dividing each buoyant member into compartments, part of these compartments alternately being filled with water to provide immersion or air to provide raising thereof onto the sea surface.

DETAILED DESCRIPTION OF PREFERRED EMBODIMENTS

Figure 9:
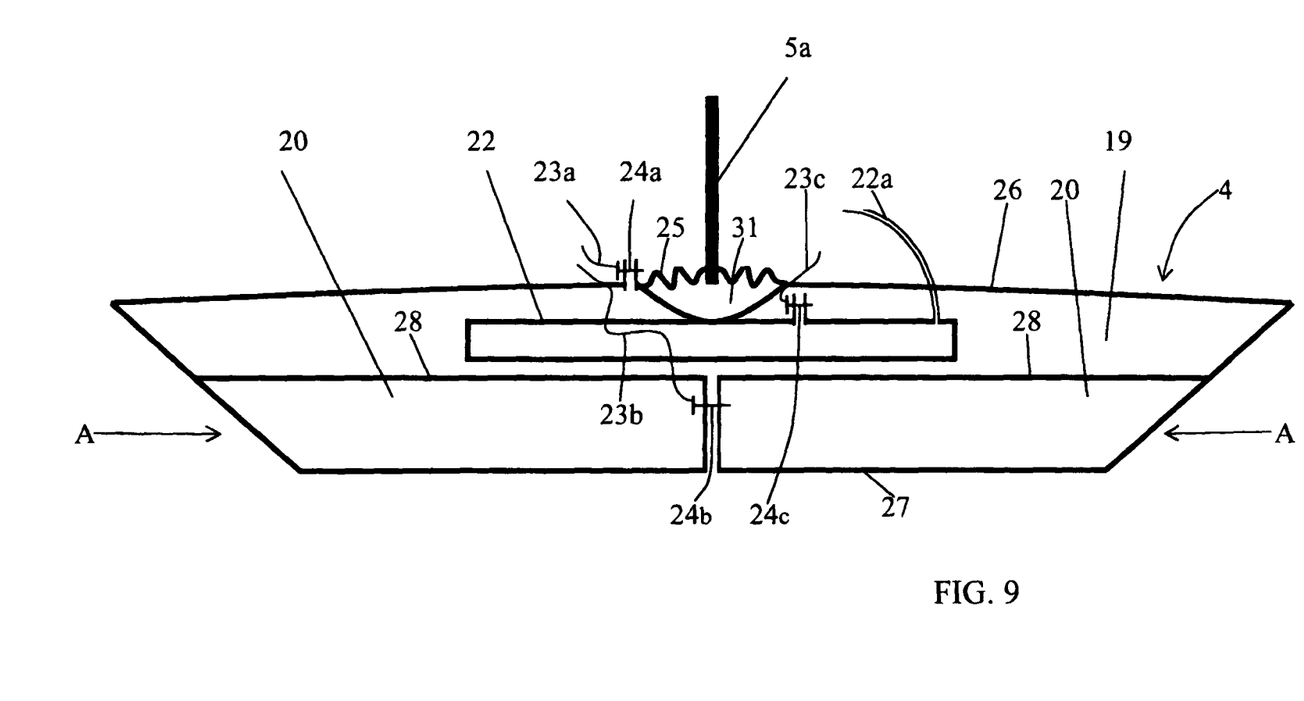
FIG. 9 shows a vertical cross sectional view of a first preferred embodiment of the buoyant member.

The wave energy collecting device of the invention is accomplished with an arrangement of buoyant members 4, each such buoyant member 4, as illustrated in the cross sectional view of FIG. 9, preferably having the shape of a truncated geometrical solid and in particular of a truncated cone with the relatively smaller planar basement 27 of the truncated side being oriented towards the seabed and the relatively larger planar basement 26 being adapted to float onto the sea surface. The buoyant member 4 may also take other functionally appropriate forms, e.g. the form of a truncated pyramid with a relatively larger and a relatively smaller hexagonal basement.

In accordance with a preferred embodiment of the invention, the buoyant member 4 is adapted to perform controlled immersion so as to avert damages under excessively adverse weather conditions and to allow alternative usage of the sea surface. The cross sectional view of the buoyant member in FIG. 9 illustrates an embodiment of a buoyant member that can be selectively immersed, wherein a partition 28 extends parallel in between planar basements 26, 27 and divides buoyant member 4 in an upper compartment 19 and a lower compartment 20.

Figure 11:
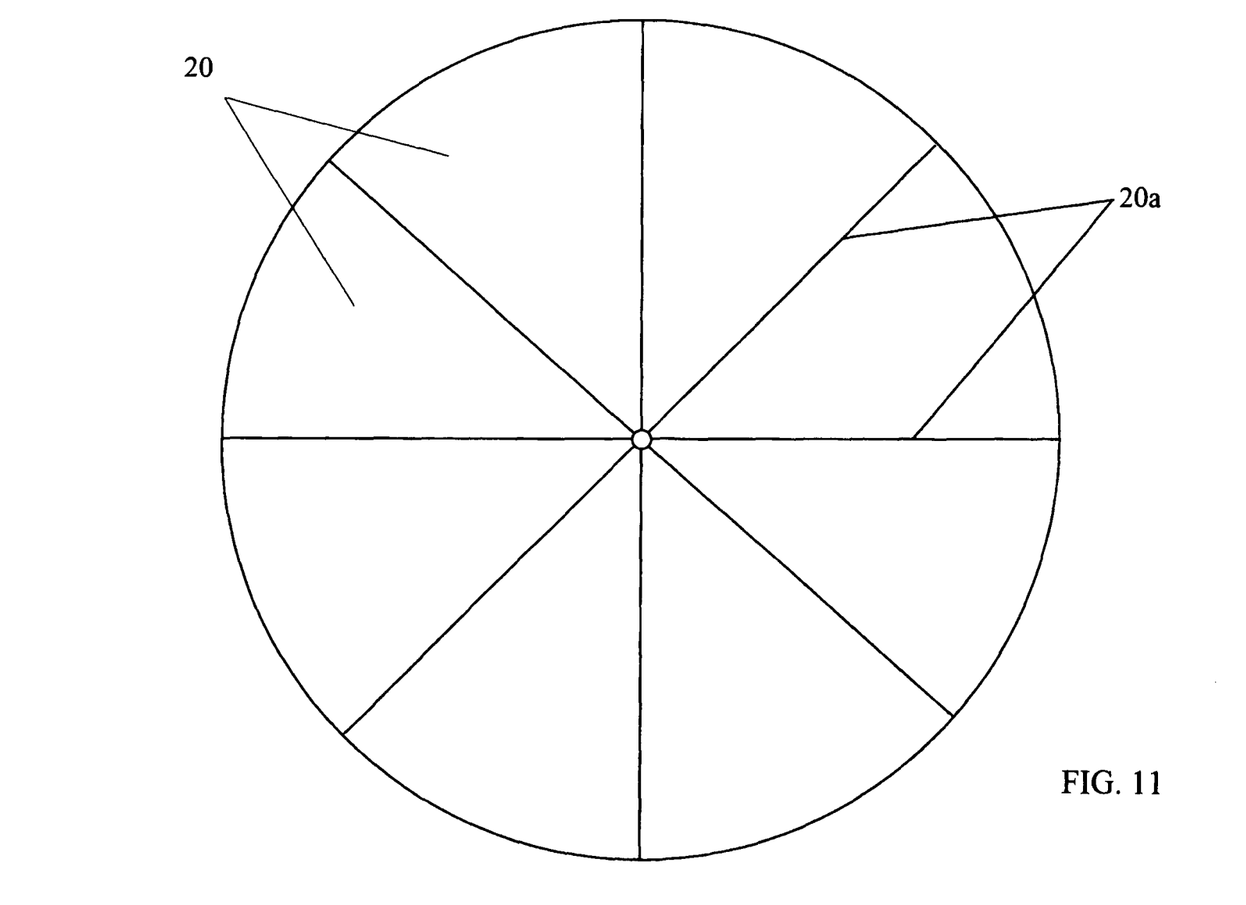
FIG. 11 shows a plan cross sectional view of a buoyant member along axis A-A of FIG. 9.

As shown in the plan cross sectional view of FIG. 11, the lower compartment 20 that is filled with water is advantageously divided by means of radially extending members 20a into a series of smaller compartments so as to substantially reduce the agitating effect due to movement of the bulk of water contained therein. Whilst the lower compartment 20 is filled with water under any circumstances, the upper compartment 19 is alternatively being filled with air when the buoyant member 4 is adapted to float on the sea surface, whereas it is being filled with water when immersion thereof is desired.

Figure 14:
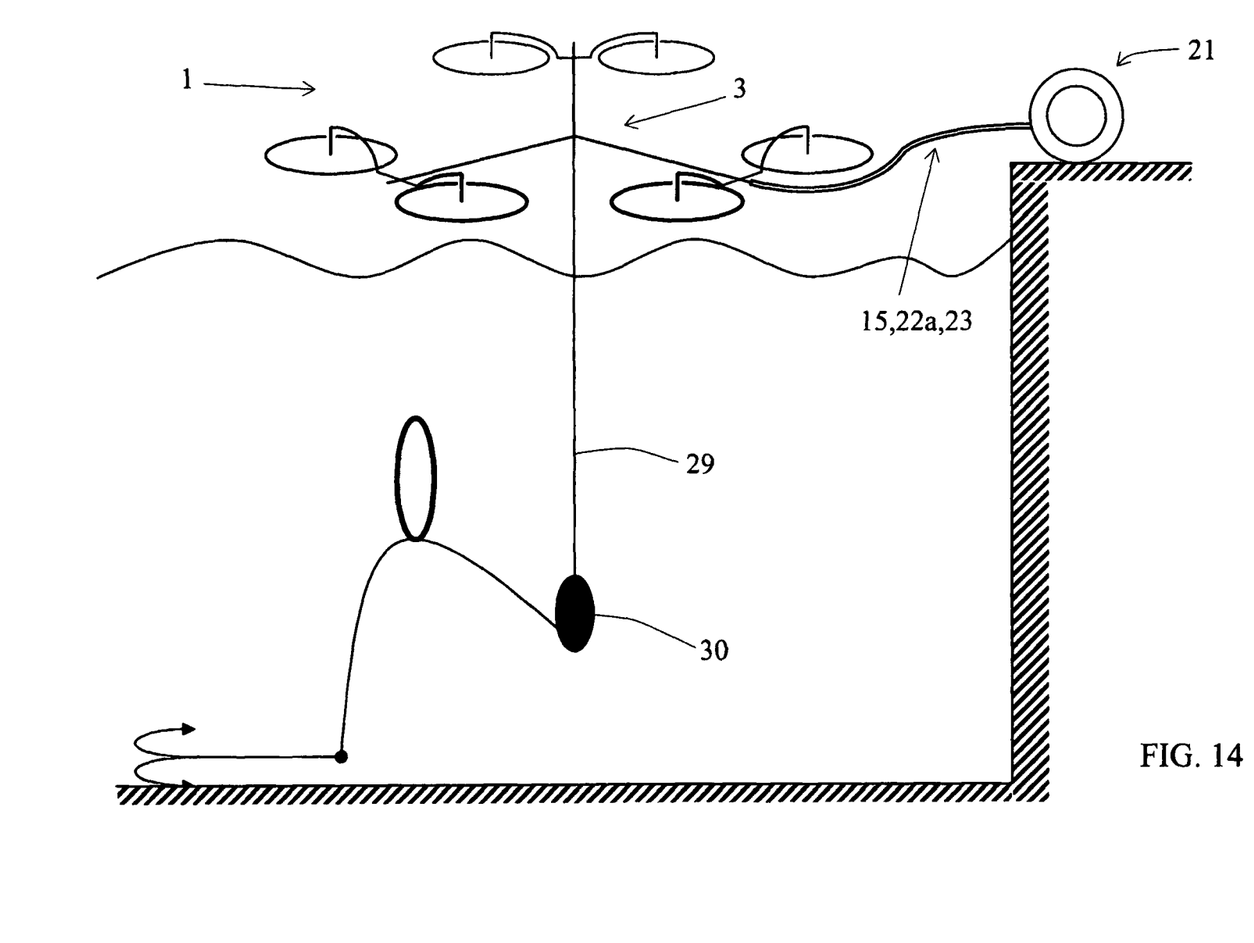
FIG. 14 shows an illustrative positioning of the wave energy collecting device of the invention relatively to the seabed and the coast.

As shown in FIG. 9, upper compartment 19 includes a tank 22 that is being filled with compressed air via pipe means 22a. Such compressed air tank 22 comprises an electrically operated valve 24c, whilst the upper compartment 19 comprises a pair of electrically operated valves 24a, 24b. Cables 23a, 23b, 23c are correspondingly provided for the remote control of valves 24a, 24b, 24c. The wave energy collecting device of the invention further comprises a suitable plurality of sinker weight means 30 adapted to allow controlled immersion thereof (FIG. 14).

When immersion of the wave energy collecting device of the invention is desired, a remotely controlled command effects opening up of the electrically operated valves 24a, 24b in each buoyant member 4 so as to allow water to enter into the upper compartment 19 thereof, thereby resulting in immersion of the buoyant member 4, the depth of immersion being controlled by the weight sinker means 30, i.e. immersion stops when such weight sinker means 30 touches the seabed. As soon as buoyant members 4 arrive at such equilibrium immersed condition, thereby freely floating at a predetermined depth below the water surface, raising of the same onto the sea surface is selectively initiated when another remotely controlled command results in closure of the upper valve 24a in compartment 19 and opening up of the electrically operated valve 24c of the compressed air tank 22, whereby compressed air being discharged from compressed air tank 22 fills upper compartment 19 enabling a forced discharge of the water contained therein through the bottom valve 24b thereof that eventually closes following raising of buoyant member 4 onto the sea surface. Following refloating of the buoyant member 4 onto the sea surface, tank 22 is being refilled with compressed air via duct means 22a so as to render the buoyant member capable of another refloating process after an immersion.

A tubular shaft connecting means 5 is employed to connect adjacent buoyant members 4 in pairs. In accordance with a first preferred embodiment of the invention depicted in FIG. 2, the tubular shaft connecting means 5 comprises a pair of equivalent vertically upright extending members 5a, followed by a pair of equivalent curvilinear downwardly extending members 5b connected by a horizontally oriented member 5c located at a level approximating the level of the floating upper planar basement 26 of buoyant members 4, such horizontally oriented member 5c comprising a perpendicularly medially upwardly extending rectangularly shaped member 6 that is employed in the connection of tubular shaft connecting means 5 with a trilateral radial plank member 3 to be described herein below.

Figures 2, 2A:
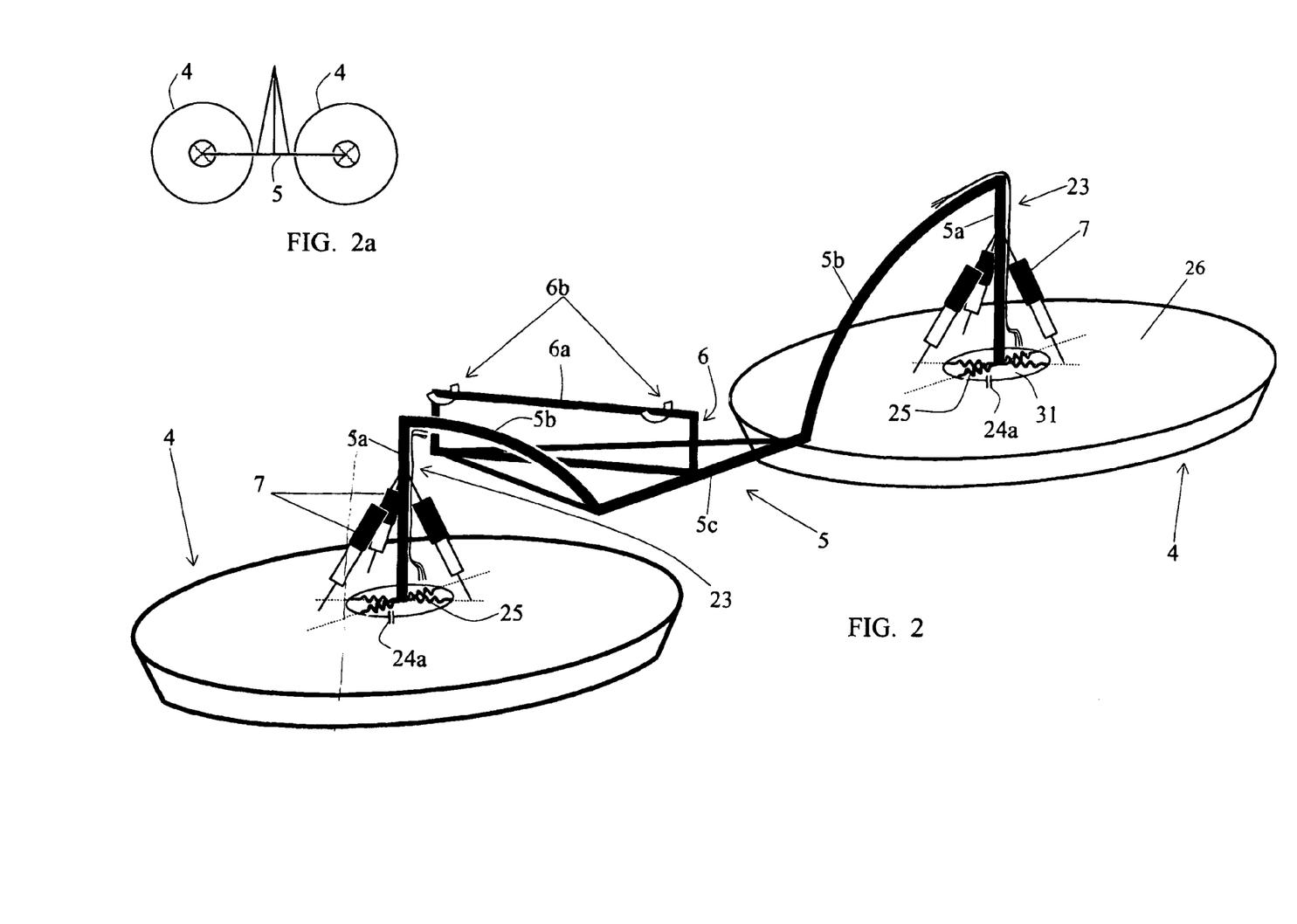
FIG. 2 shows a perspective and FIG. 2a shows a cross sectional view of a pair of buoyant members, each incorporating an array of wave energy exploiting pumps, wherein the buoyant members are interconnected by means of a tubular shaft connecting means.
Figure 10:
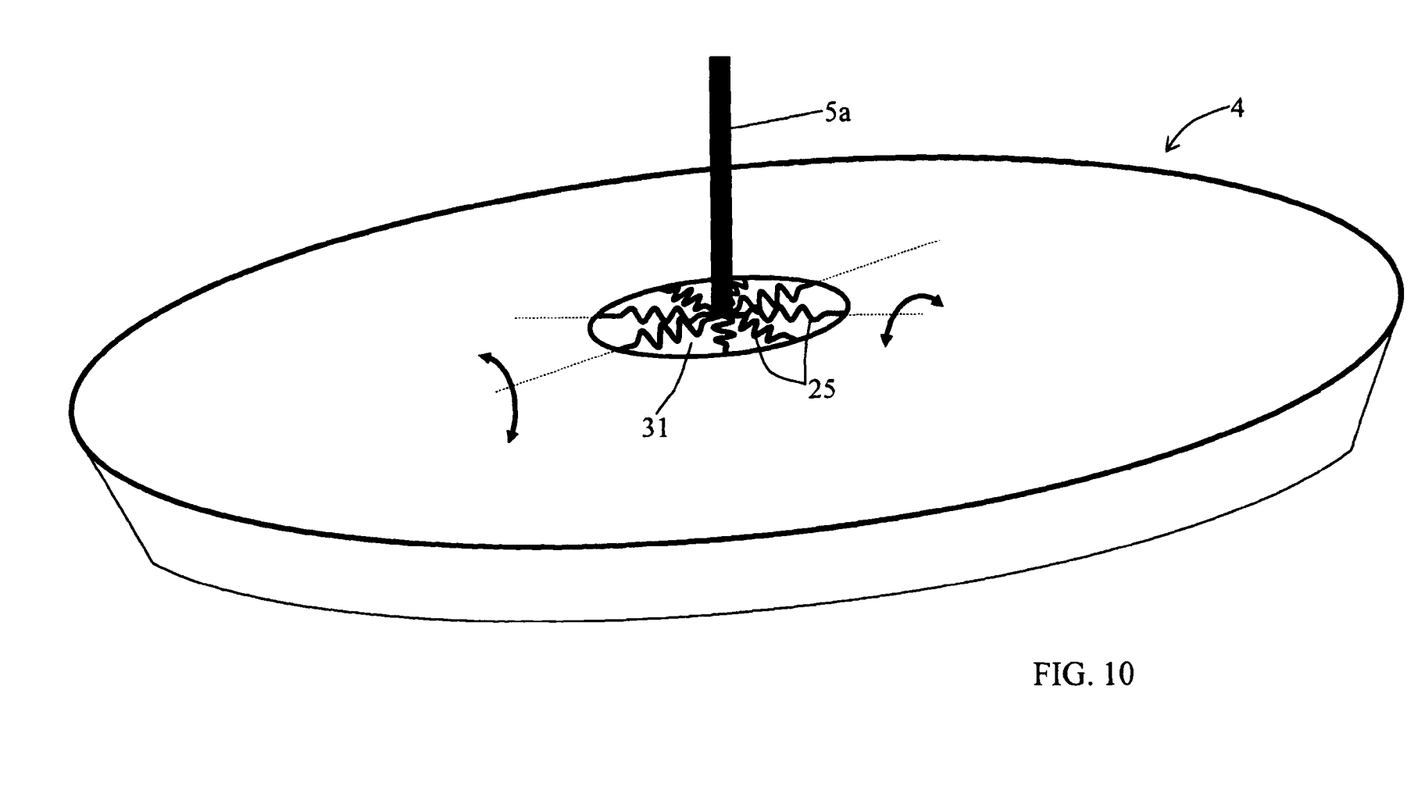
FIG. 10 shows a perspective view of the buoyant member of FIG. 9 with the vertically oriented centrally located member of the tubular shaft connecting means being linked to the buoyant member by means of a perimetrical array of radially extending springs.

As shown in FIGS. 9 and 10, each buoyant member 4 is provided with a centrally located cavity 31 wherein is being fitted the vertically upright extending member 5a of the tubular shaft connecting means 5 appropriately surrounded by a perimetrical array of shock absorbing radially extending springs 25. As shown in FIG. 2, an array of preferably three upwardly inclined pumps 7 is mounted onto the upper planar basement 26 of each buoyant member 4 perimetrically around the abovementioned centrally located cavity 31 thereof with the other ends of pumps 7 terminating onto the vertically upright extending member 5a of the tubular connection means 5.

Figures 12, 12A:
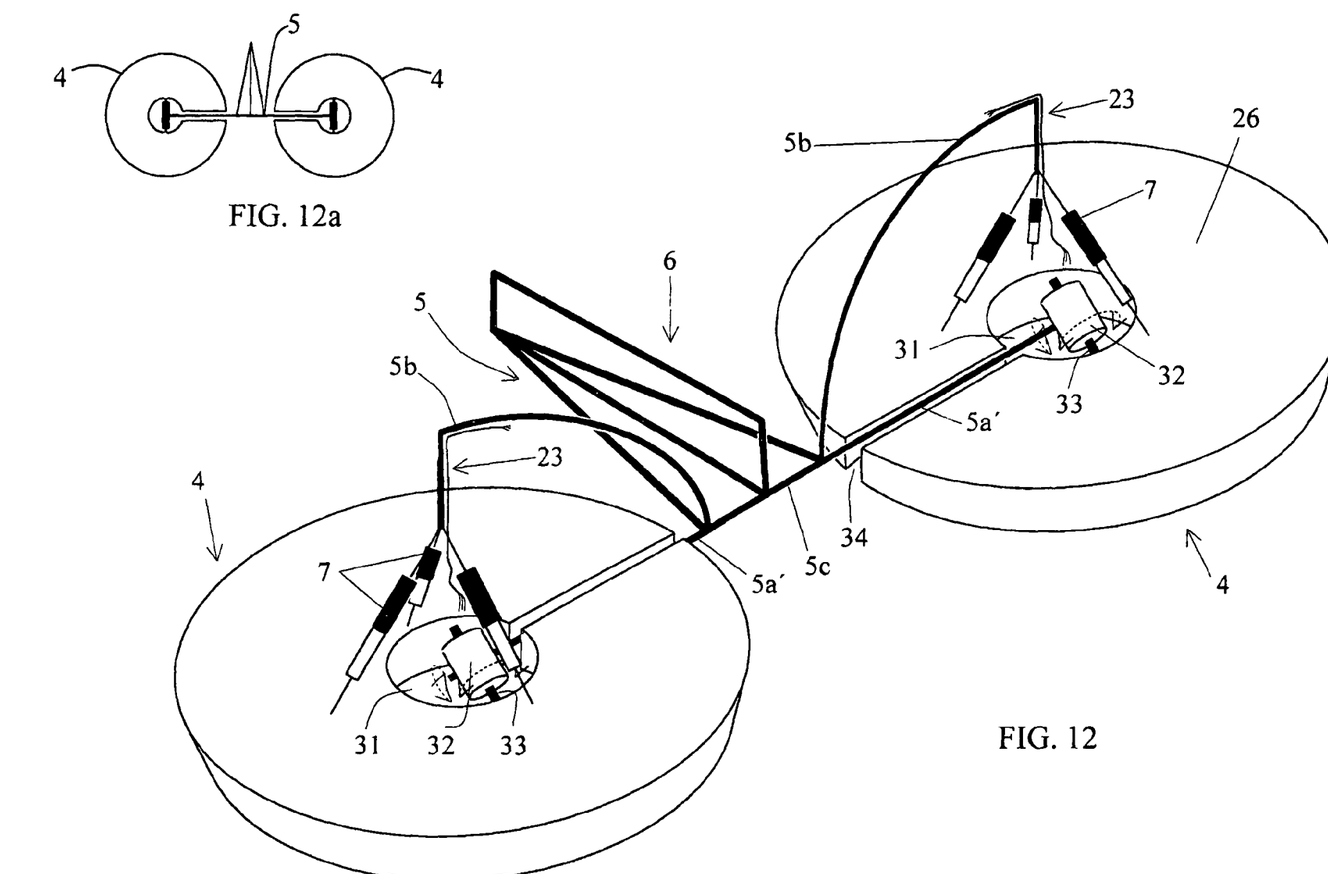
FIG. 12 shows in perspective and FIG. 12a shows a plan view of an alternative mode of connection of a pair of a second preferred embodiment of buoyant members with a tubular shaft connecting means.
Figure 13:
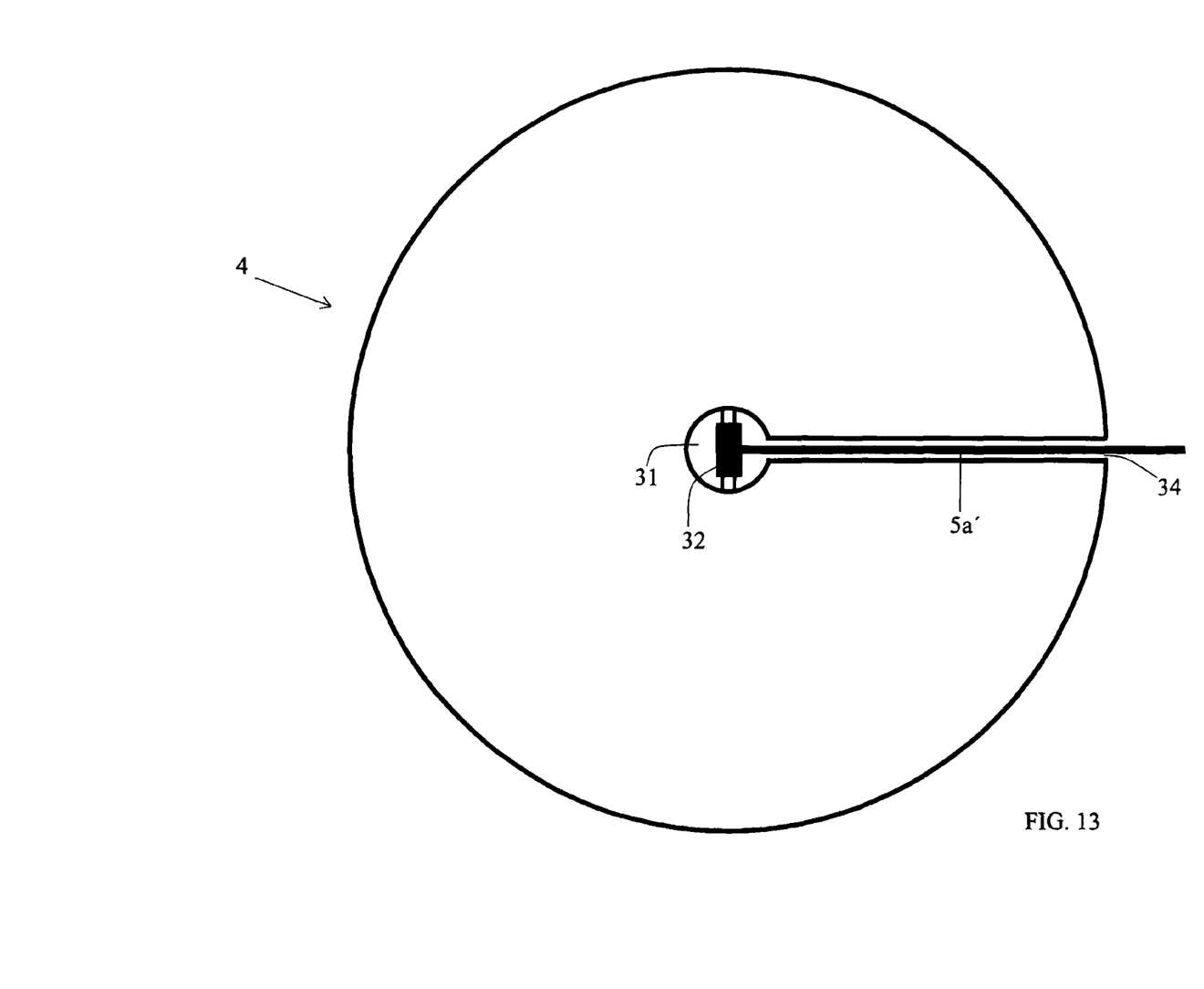
FIG. 13 shows a plan view of the alternative second preferred embodiment of the buoyant member depicted in FIG. 12.

In accordance with a second preferred embodiment of the invention, FIG. 12 illustrates a pair of alternative buoyant members 4 and an alternative tubular shaft connecting means 5. Each buoyant member 4 comprises a narrow radial slot 34 extending radially from the centrally located cavity 31 to the circumference thereof (FIG. 13). A tube 32 is pivotally mounted onto a shaft 33 within cavity 31 and is freely rotatable around the same. Two equivalent lengths 5a' of the tubular shaft connecting means 5 pass through abovementioned radial slots 34 of a pair of adjacent buoyant members 4 and extend into a horizontally oriented member 5c beyond and in between the adjacent buoyant members 4. A rectangularly shaped member 6 extends perpendicularly and medially upwardly oriented with respect to member 5c, such member 6 being employed in the connection of tubular shaft connecting means 5 with a trilateral radial plank member 3. In this case also, an array of preferably three upwardly inclined pumps 7 is mounted onto the upper planar basement 26 of each buoyant member 4 perimetrically around the abovementioned centrally located cavity 31 thereof with the other ends of pumps 7 terminating onto a vertically upright extending portion of member 5b of the tubular connection means 5.

Figures 1, 1A:
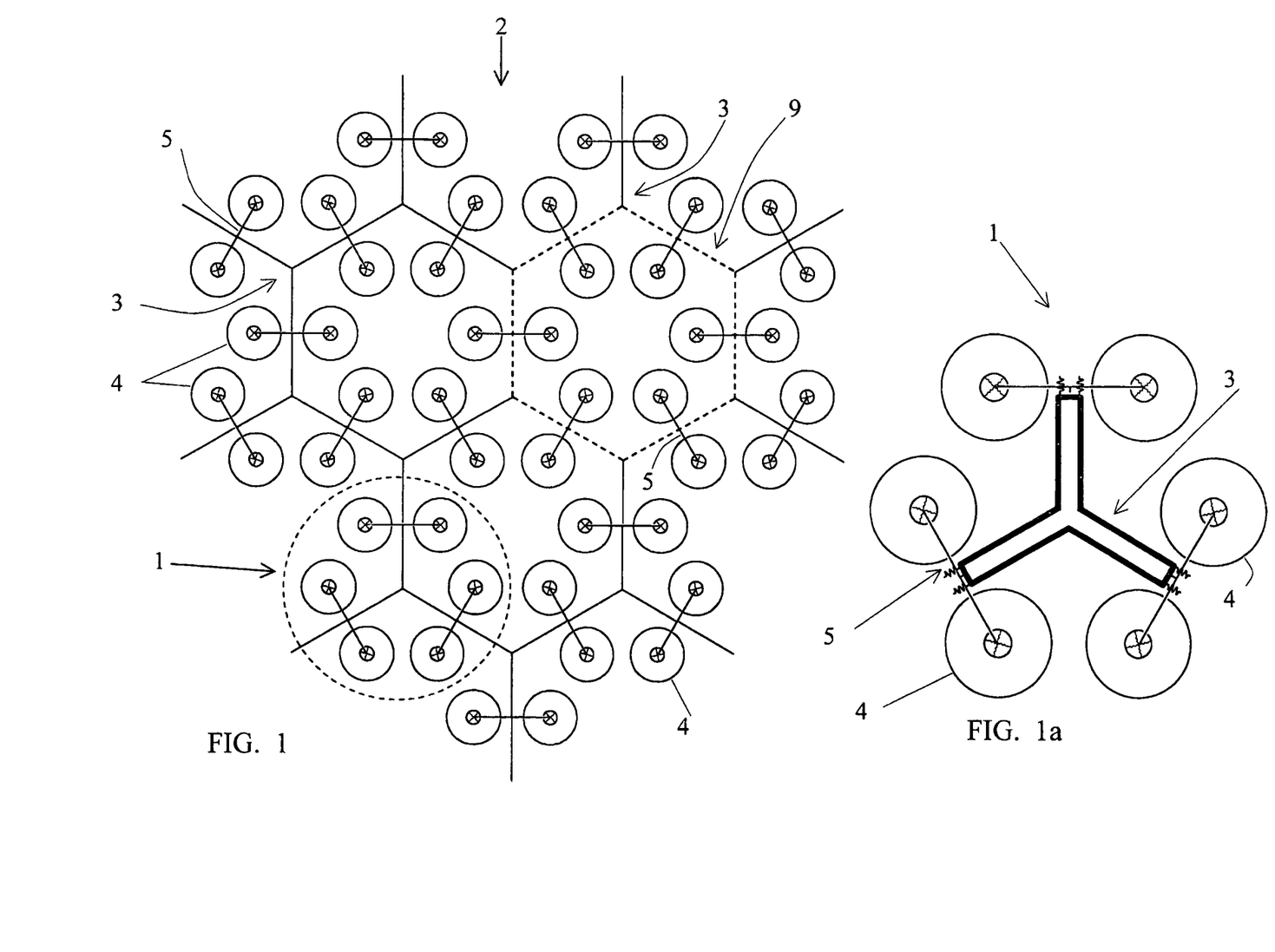
FIG. 1 illustrates a plan view of the multidirectionally extendable wave energy collecting device of the invention.
FIG. 1a illustrates a single module of the wave energy collecting device of the invention.

As depicted in FIG. 1a a typical module 1 of the wave energy collecting device of the invention comprises three pairs of adjacent buoyant members 4 interconnected by means of three corresponding tubular shaft connecting means 5. A trilateral radial plank member 3 comprising three identical equidistantly spaced members forming an overall triangular configuration is located centrally in the free space between the three surrounding, pairs of buoyant members 4. Each one of the three radially extending plank members of the trilateral radial plank member 3 is a rectangularly shaped board with a typical width of the order of 50-60 cm, so as to enable comfortable walking thereupon of personnel visiting the wave energy collecting device with a scope of inspection and/or repair as per illustrative numeral 16 in FIG. 6.

Figure 7:
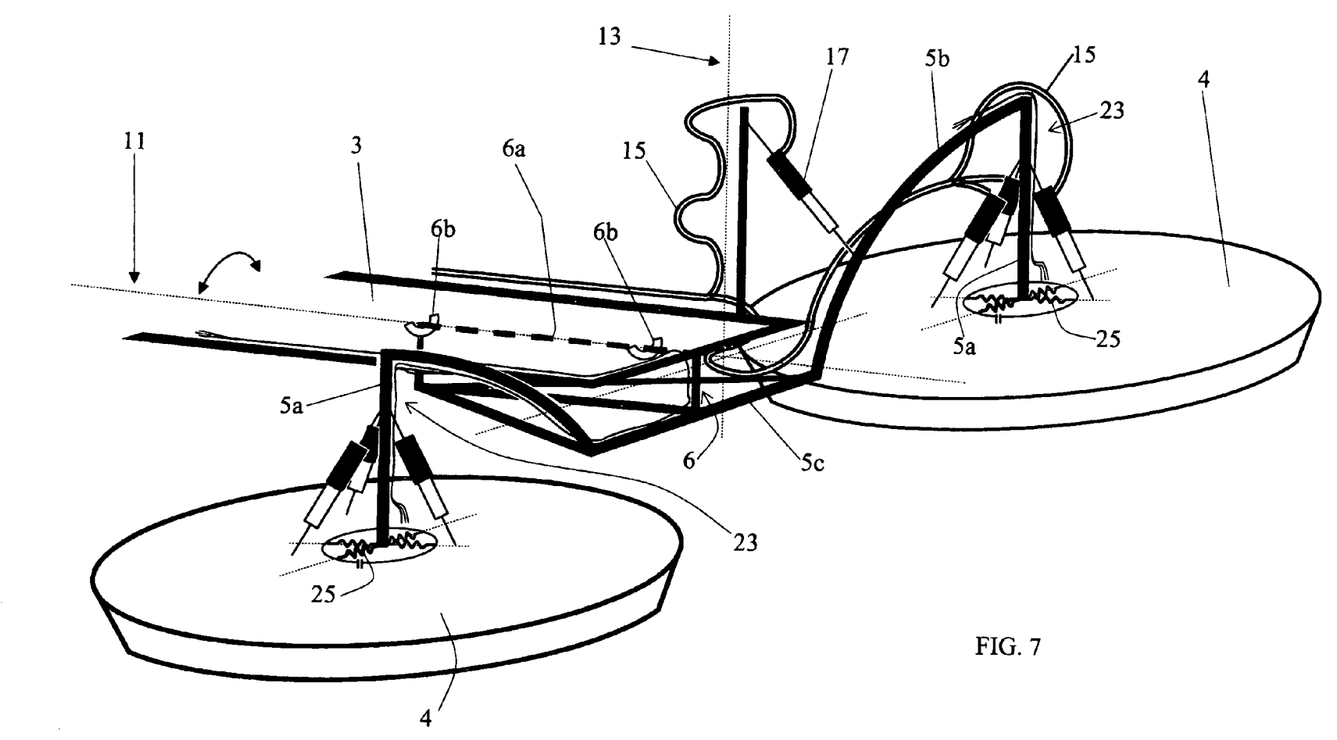
FIG. 7 presents a detail of the connection of the tubular shaft connecting means of a pair of adjacent buoyant members with a trilateral radial plank member.

Each one of the three radially extending plank members of the trilateral radial plank member 3 is connected with a corresponding one of the three tubular shaft connecting means 5 of the three pairs of adjacent buoyant members 4 surrounding the trilateral radial plank member 3. In this respect each tubular shaft connecting means 5 is provided with a perpendicularly upwardly extending, rectangularly shaped member 6, one upper side of which comprises a shaft 6a that is pivotally hinged to a corresponding radially extending member of the trilateral radial plank member 3, wherein shaft 6a of the upwardly extending member 6 is mounted onto bearings 6b, so that the overall tubular shaft connecting means 5 may freely rotate, the kinetic energy embodied in such wave induced rotation being advantageously collected through pump means 17 depicted in FIG. 7.

Figure 3:
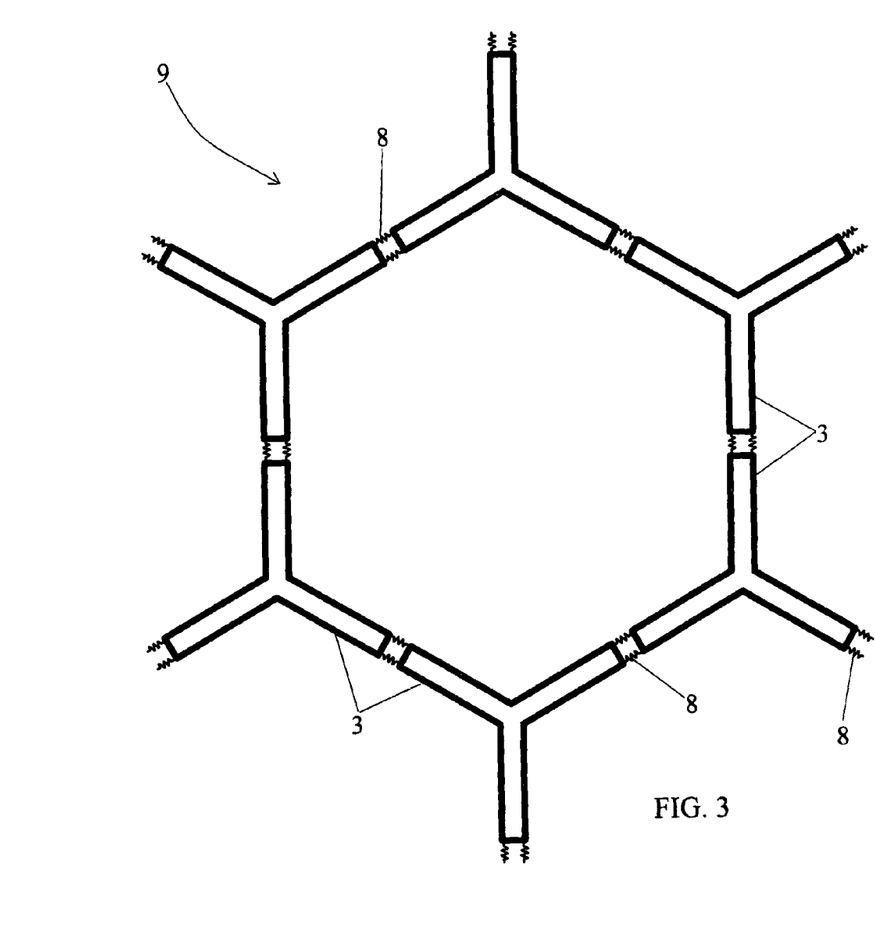
FIG. 3 shows an array of trilateral radial plank members being successively connected to form hexagonally shaped arrays of radial plank members.
Figure 3A:
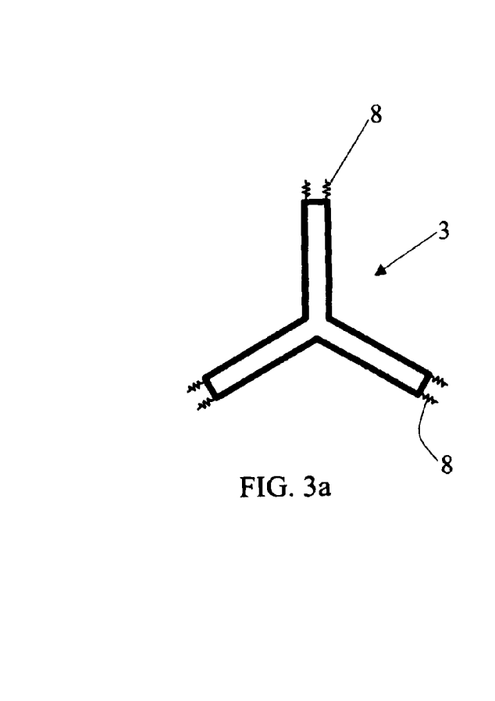
FIG. 3a illustrates a single trilateral radial plank member of the array of FIG. 3.
Figure 4:
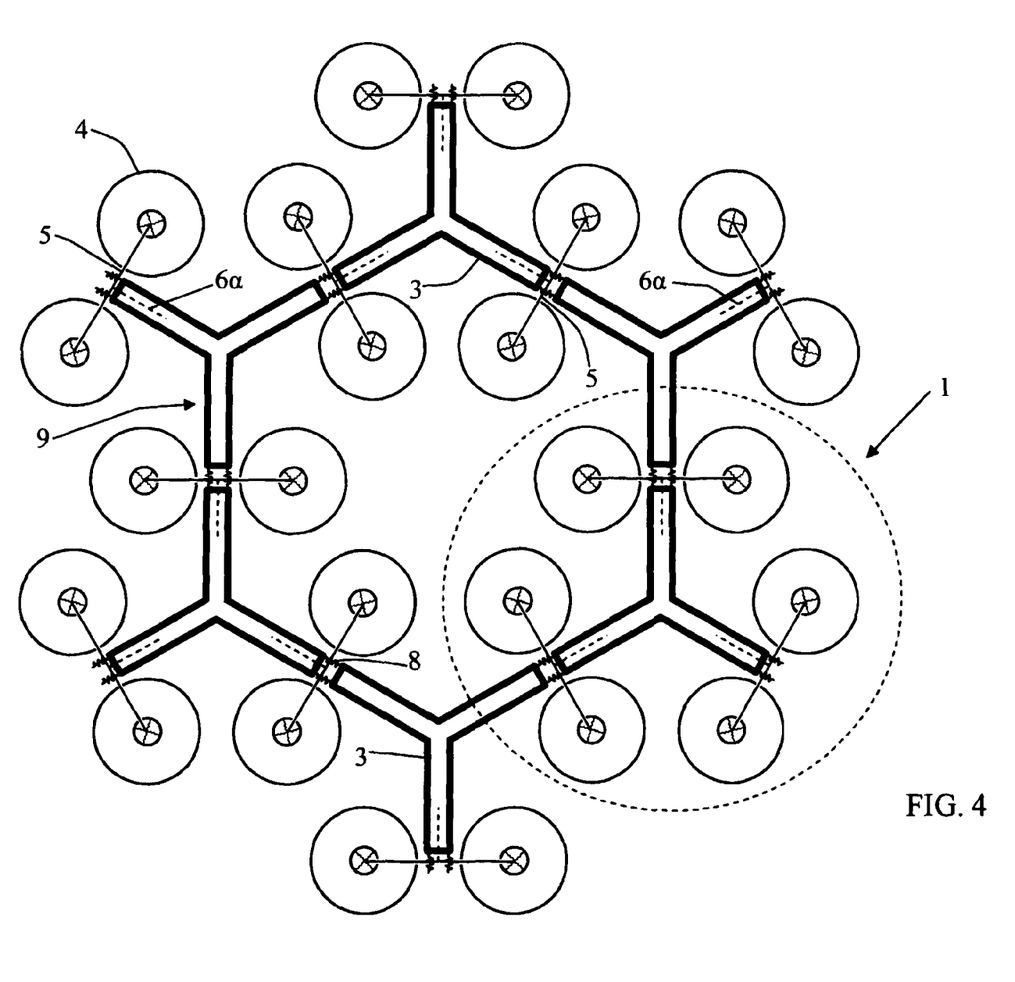
FIG. 4 shows a detail of the multidirectionally extendable wave energy collecting device of the invention.
Figure 5:
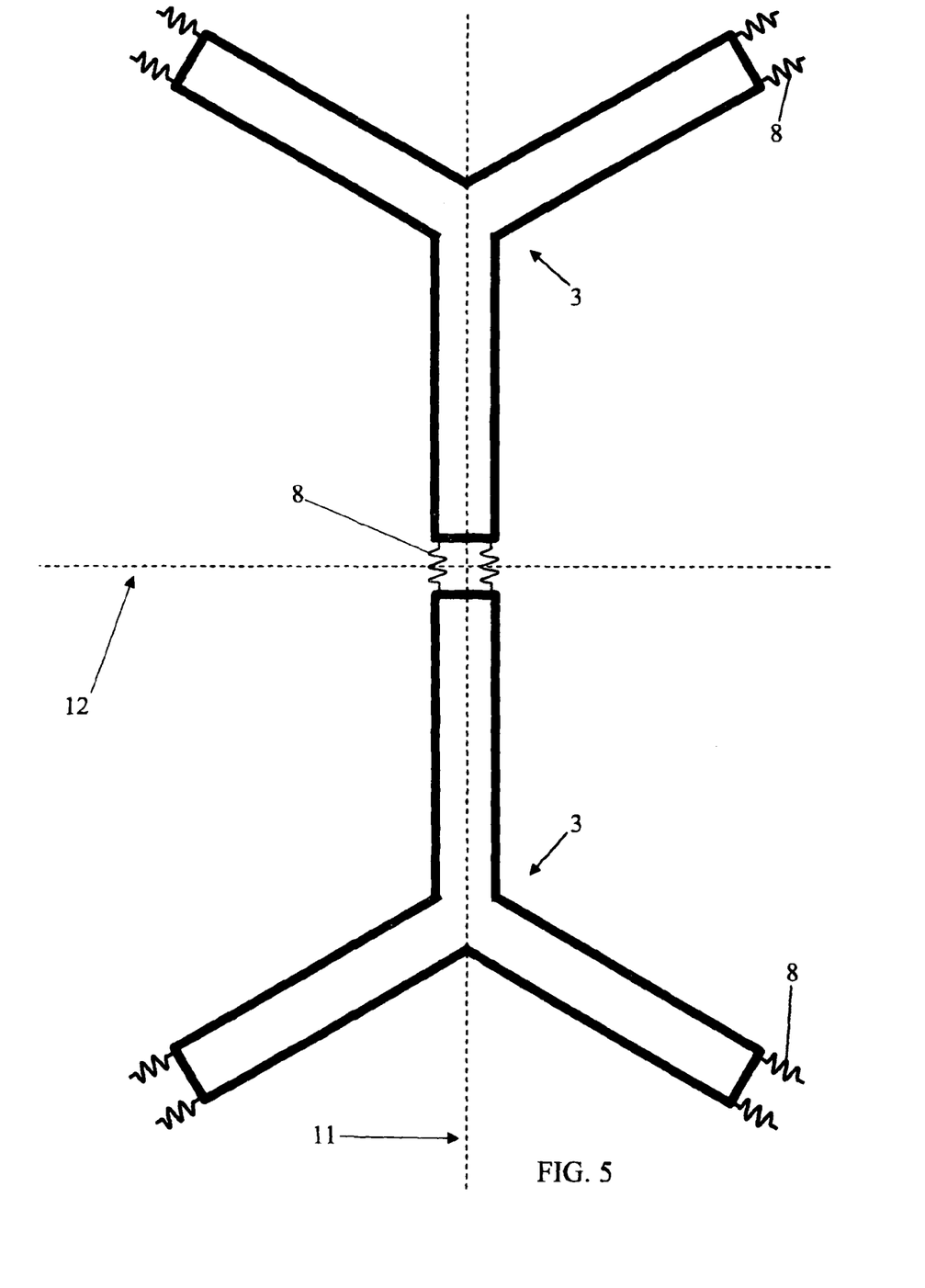
FIG. 5 illustrates a plan view of a detail of a pair of trilateral radial plank members interconnected by means of spring assemblies, a pair of orthogonally intersecting axes being depicted, one axis extending along the axis of connection of two sequential trilateral radial plank members and the other axis extending perpendicularly along the junction thereof.
Figure 6:
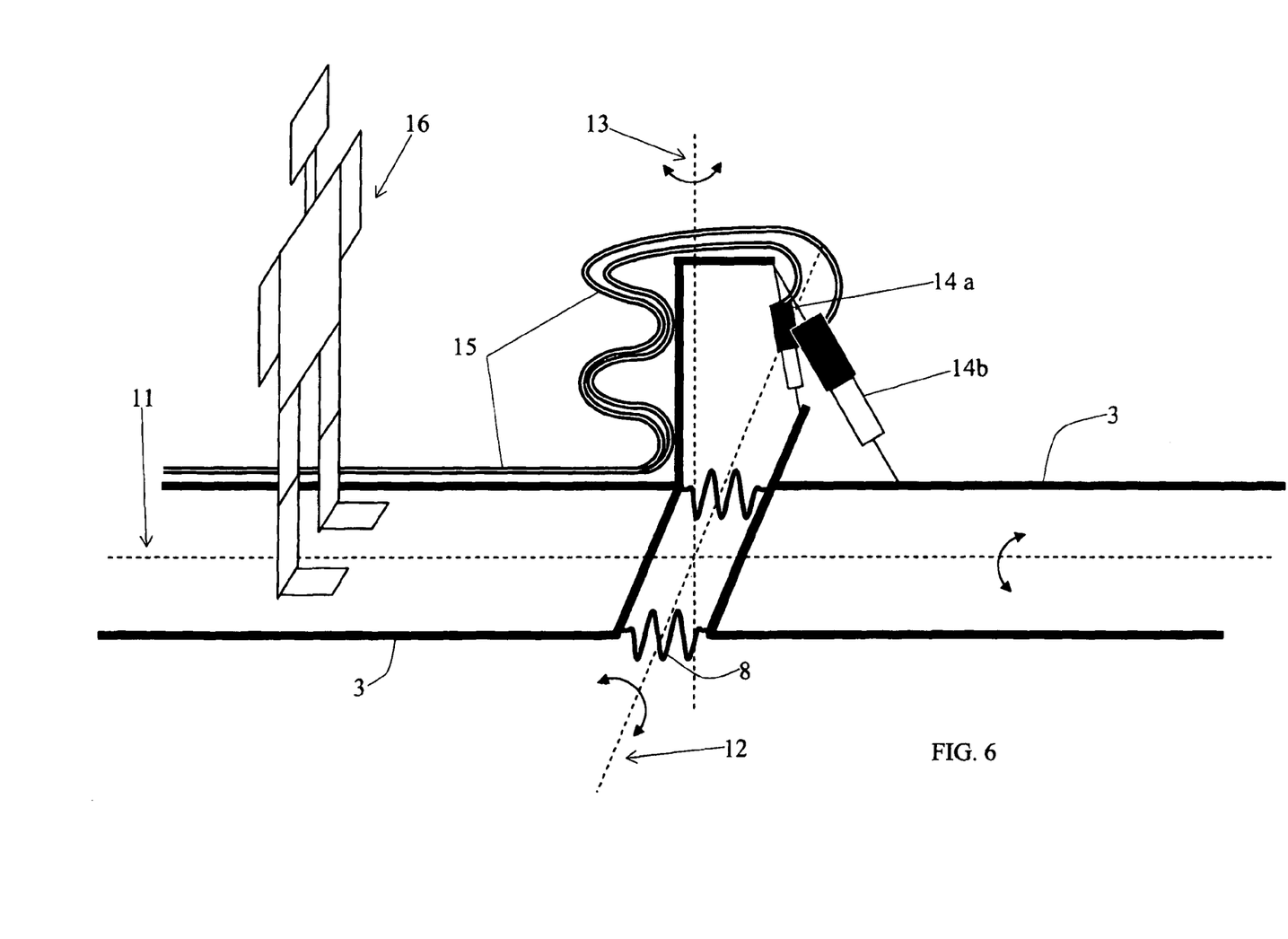
FIG. 6 shows a detail of the spring assembly interconnecting the pair of trilateral radial plank members of FIG. 5, the assembly being adapted to move along the axes defined hereinabove and along a third axis perpendicularly oriented with respect to the plane of the pair of orthogonally intersecting axes of FIG. 5, the spring assembly incorporating an array of pumps for exploiting wave induced movement thereof.

As depicted in FIG. 3 or FIG. 4, each one of the identical radially extending members of the trilateral radial plank member 3 is connected to an identical member of an adjacent trilateral radial plank member 3 by means of a spring assembly 8 that allows elastic displacement of the overall structure in response to wave motions irrespective of the direction of the latter, such displacements along any direction of the three dimensional space defined by orthogonally intersecting axes 11, 12 at the plane of radial plank members 3 and axis 13 extending perpendicularly onto the plane of the orthogonally intersecting axes 11, 12 (FIG. 5) being advantageously exploited by means of an array of pumps 14a, 14b appropriately located adjacently to each one of the spring assemblies 8, so that pump 14a may absorb torsion stresses and pump 14b may absorb vertical stresses exerted onto the spring assembly 8 (FIG. 6). It is hereby noted that as shown in FIG. 3 or 4 and in FIG. 1 sequentially connected trilateral radial plank members 3 form an overall hexagonal configuration 9.

As shown in FIG. 1, a desired plurality 2 of the hereinabove described and depicted in FIG. 1 a basic modules 1 are employed to form the wave energy collecting device of the invention as illustratively shown in FIG. 1. It is hereby evident that the multidirectionally extendable device of the invention is capable of wave energy exploitation irrespective of the direction thereof and that it can provide substantially increased wave energy exploitation per unit area covered, whereas its selectively effected immersion and refloating capacity renders it suitable for installation at an increased multitude of available sites.

A pipe network 15 of the wave energy collecting working medium that may be any appropriately selected fluid whatsoever is lined along the sequential buoyant member tubular shaft connecting means 5 and along corresponding radial plank members 3. In the same manner are lined the cables 23 that divide into component cables 23a, 23b, 23c providing remotely controlled functioning of the respective electrically operated valves 24a, 24b, 24c of the immersion controlling system of each one of the buoyant members 4 of the wave energy collecting device of the invention and in the same manner is being lined the piping 22a provided for filling tank 22 of each buoyant member 4 with compressed air.

Figure 8:
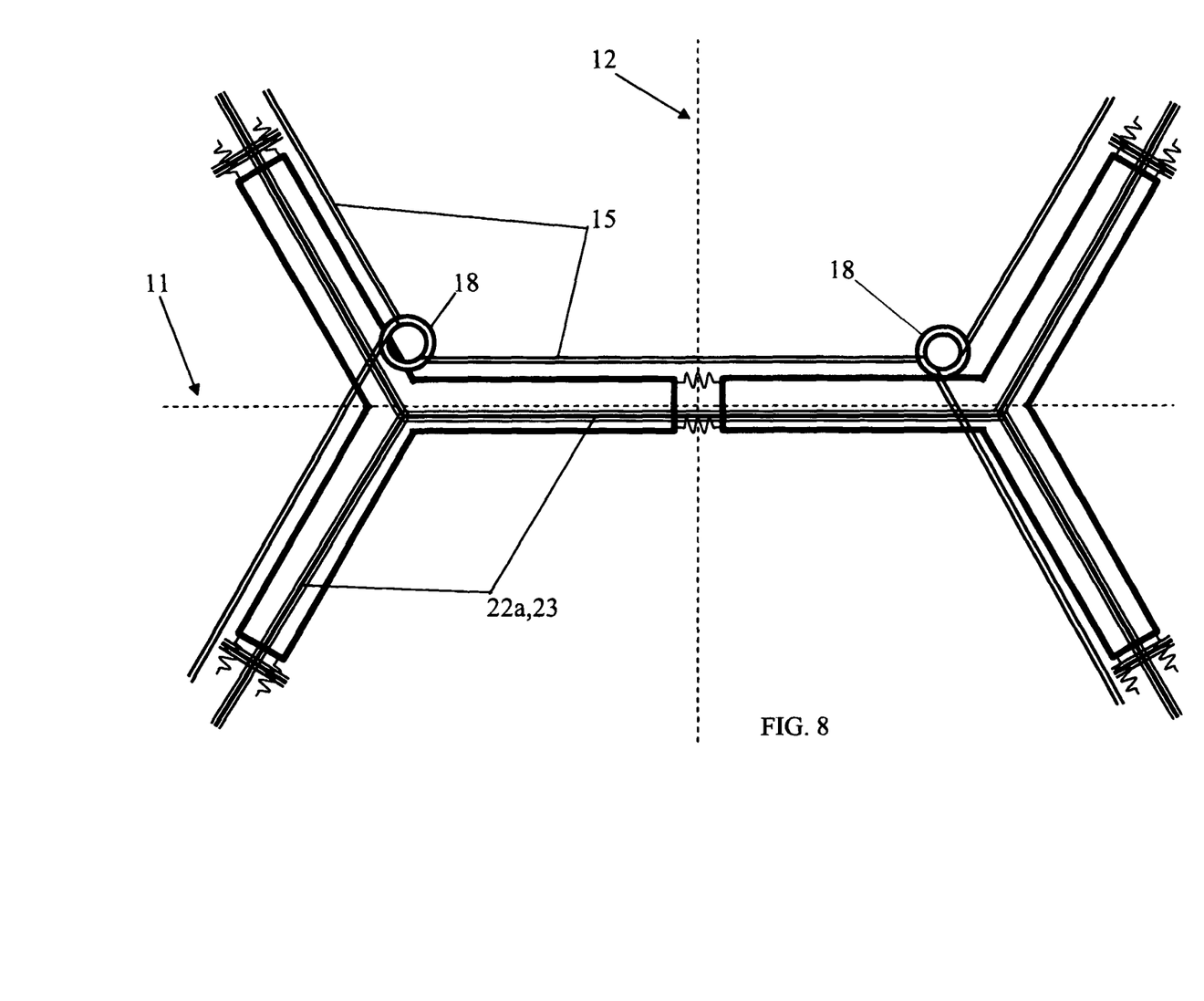
FIG. 8 illustrates a detail of the pipe network within which occurs wave induced movement of a working fluid medium and of the cable network for the remotely controlled immersion system of the wave energy collecting device of the invention.

As shown in FIG. 8 each trilateral radial plank member 3 comprises a pair of fluid tanks 18, one of which is maintained at relatively high and the other at relatively low pressure, whereby all relatively high pressure fluid tanks are interconnected in parallel and all relatively low pressure fluid tanks are also interconnected in parallel so as to obtain the same standard value of high pressure in all high pressure tanks and the same standard value of low pressure in all low pressure tanks and thereby appropriately regulate the pressure of the working fluid medium as it is being pressed through the arrangement of wave motion exploiting pumps in the wave energy collecting device of the invention.

It is herein noted that an appropriate number of the hereinabove mentioned sinker weight means 30 is suspended via string means 29, vertically downwardly extending towards the seabed. Such sinker weight means 30 is preferentially suspended at the central junction of the three radially extending plank members of a selected, appropriately spaced, plurality of trilateral radial plank members 3.

As shown in FIG. 14 the pipe network 15 of the fluid working medium, the cable circuitry 23 providing remotely controlled functioning of the electrically operated valves 24a, 24b, 24c of the immersion controlling system and the compressed air supply duct 22a are all led at the coast wherein is located appropriate machinery 21 for the conversion of the energy embodied in the working fluid medium into any appropriately exploitable form of energy whatsoever. It is hereby noted that the immersion controlling system may as well function automatically in response to an appropriate provision of sensor means.

The net result of the wave energy collecting device of the invention is the outcome of three component processes of wave energy exploitation, i.e. the wave energy exploitation obtained through the array of pumps 7 in each one of the buoyant members 4, that obtained through the array of pumps 14a, 14b appropriately located alongside the spring assembly 8 connecting each pair of adjacent trilateral radial plank members 3, and that obtained through pump means 17 that advantageously exploits wave induced rotational movement around shaft 6a of each tubular shaft connection means 5 relatively to the trilateral radial plank member 3 it is connected with. A maximal exploitation of wave energy is obtained from the abovementioned combined effect of three component wave exploiting processes.

It is further noted that a relatively steady maximal wave energy converting efficiency is obtained also because of the predetermined different lengths of a) the diameter of the buoyant member 4, b) the length of the tubular shaft connecting means 5 and c) the diameter of the typical module 1 of the wave energy collecting device of the invention. Such dimensional variation advantageously exploits varying wavelengths to produce a relatively steady energy outcome, since torques being produced are related to the producing wavelengths. It is practically anticipated that the wave energy collecting device will provide an equivalent, steady energy outcome for waves with a wavelength varying in between the length of the diameter of a buoyant member 4 and double the length of the diameter of the typical wave energy collecting module 1.

It is hereby noted that any changes or amendments in the above that do not constitute a new inventive step are considered part of the scope and aims of the present invention as defined in the claims.

The invention claimed is:

1. Wave energy collecting device comprising an array of buoyant members (4), each buoyant member (4) being provided with an upper planar basement (26) and a lower planar basement (27), structural members interconnecting said array of buoyant members (4), a pipe network (15) being lined along said structural members, a working fluid medium flowing within said pipe network (15), a plurality of pumps (7, 14a, 14b, 17) being employed to impart wave induced pressure pulses in said working fluid medium and appropriate machinery (21) receiving an input of said working fluid medium and providing an output of appropriately exploitable energy, characterised in that a repeatable module (1) of said wave energy collecting device comprises three pairs of buoyant members (4), a tubular shaft connecting means (5) being employed to interconnect each pair of buoyant members (4), said three pairs of buoyant members (4) being arranged in a circular configuration, a trilateral radial plank member (3) comprising three identical equidistantly spaced members being located centrally within said circular configuration of said three pairs of buoyant members (4), each one of said three identical members of said trilateral radial plank member (3) extending perpendicularly across each said tubular shaft connecting means (5) in between a pair of buoyant members (4), each said tubular shaft connecting means (5) being provided with a medially upwardly extending rectangularly shaped member (6), an upper side of said rectangularly shaped member (6) constituting a shaft means (6a), said shaft means (6a) of each said tubular shaft connecting means (5) being pivotally hinged to one of said three identical equidistantly spaced members of said trilateral radial plank member (3), each member of said trilateral radial plank member (3) of said module (1) being linearly connected to a member of the trilateral radial plank member (3) of an adjacent module (1) through an elastically loaded spring assembly (8), a first array of upwardly inclined pumps (7) being mounted onto said upper planar basement (26) of each buoyant member (4) perimetrically around a centrally located cavity (31) and onto a vertically upright extending member of the tubular shaft connecting means (5), said first array of pumps (7) imparting a first pressure pulse in said working fluid medium in response to wave induced movement of said buoyant member (4), a second array of pumps (17) being located adjacently each said shaft means (6a) pivotally hinged to one member of said trilateral radial plank member (3), said second array of pumps (17) imparting a second pressure pulse in said working fluid medium in response to wave induced rotation of said tubular shaft connecting means (5) around said shaft means (6a), and a third array of pumps (14a, 14b) being located adjacently each said spring assembly (8) to impart a third pressure pulse in said working fluid medium in response to wave induced movement of said spring assembly (8), pump (14a) absorbing torsion stresses and pump (14b) absorbing vertical stresses exerted onto the spring assembly (8).

2. Wave energy collecting device as claimed in claim 1, characterised in that each one of the three identical equidistantly spaced members of said trilateral radial plank member (3) is a rectangularly shaped board having a width allowing comfortable walking thereupon of personnel visiting the wave energy collecting device, and in that sequentially connected trilateral radial plank members (3) form an overall hexagonal configuration (9), said hexagonal configuration (9) extending perimetrically around six discrete buoyant members (4) belonging to three adjacently disposed modules (1) of the wave energy collecting device, said wave energy collecting device thereby being desirably multidirectionally extendable through employment of a desired plurality of said repeatable modules (1) and sequential connection of said trilateral radial plank members (3).

3. Wave energy collecting device as claimed in claim 1, characterised in that said tubular shaft connecting means (5) employed in the connection of a pair of adjacent buoyant members (4) comprises: a horizontally oriented member (5c) extending in between said pair of adjacent buoyant members (4) and floatable at a level approximating the level of the floating said upper basements (26) of said buoyant members (4), said horizontally oriented member (5c) being provided with said perpendicularly medially upwardly extending rectangularly shaped member (6) with said shaft means (6a) pivotally hinged to one of the three identical equidistantly spaced members of said trilateral radial plank member (3); a pair of equivalent curvilinear downwardly extending members (5b) with an upper end overlying said centrally located cavity (31) of each one of said buoyant members (4) and a lower end connected to said horizontally oriented member (5c), and a pair of linear members (5a, 5a') extending from the center of said centrally located cavity (31) of each one of said buoyant members (4) to said horizontally oriented member (5c).

4. Wave energy collecting device as claimed in claim 3, characterised in that said pair of linear members (5a, 5a') is a pair of vertically extending linear members (5a), each linear member (5a) originating from said centrally located cavity (31) of each one of said buoyant members (4) wherein it is being fitted appropriately surrounded by a perimetrical array of shock absorbing radially extending springs (25) and ending at said upper end of said curvilinear downwardly extending member (5b).

5. Wave energy collecting device as claimed in claim 3, characterised in that said pair of linear members (5a, 5a') is a pair of horizontally extending linear members (5a'), each linear member (5a) originating from said centrally located cavity (31) of each one of said buoyant members (4) and connected to a freely rotatable tube (32) pivotally mounted onto a shaft (33) therein and ending at said horizontally oriented member (5c) after passing through a radially extending narrow slot (34) of said buoyant member (4).

6. Wave energy collecting device as claimed in claim 4, characterised in said buoyant member (4) having the shape of a truncated geometrical solid with said upper planar basement (26) being relatively larger than said lower planar basement (27), said relatively larger upper planar basement (26) being adapted to float marginally above the sea surface and said relatively smaller planar basement (27) being immersed in sea water and oriented towards the seabed.

7. Wave energy collecting device as claimed in claim 6, characterised in that an appropriate number of sinker weight means (30) is being suspended via string means (29) vertically extending towards the seabed, said sinker weight means (30) being suspended at the central junction of the three identical equidistantly spaced members of a selected, appropriately spaced, plurality of trilateral radial plank members (3).

8. Wave energy collecting device as claimed in claim 7, characterised in each said buoyant member (4) and appropriately the overall wave energy collecting device being adapted to immerse into sea water at a depth of immersion determined by said sinker weight means (30) touching the seabed and subsequently refloat onto the sea surface, said buoyant member (4) comprising a lower compartment (20) that is permanently filled with water and an upper compartment (19) that is alternatively filled with air when said buoyant member (4) is adapted to float onto the sea surface and filled with water when immersion thereof is effected, a compressed air tank (22) being disposed within said upper compartment (19), duct means (22a) being employed for supplying compressed air into said compressed air tank (22), valves (24a, 24b) being provided in said upper compartment (19) and valve (24c) being provided in said compressed air tank (22), a cable (23) lined along said structural members of said wave energy collecting device and divided into cables (23a, 23b, 23c) in each one of said buoyant members (4), said cables (23a, 23b, 23c) appropriately arranged to provide remotely controlled functioning of said corresponding valves (24a, 24b, 24c), wherein immersion of said buoyant members (4) and thereby of the overall wave energy collecting device is initiated when following opening of said valves (24a, 24b) water is allowed to fill said upper compartment (19) of said buoyant members (4) and refloating of said buoyant members (4) is initiated when following opening of said valve (24c) and closing of said valve (24a) the compressed air discharged from said compressed air tank (22) fills said upper compartment (19) enabling a forced discharge of water contained therein through said valve (24b) thereof.

9. Wave energy collecting device as claimed in claim 8, characterised in that said cable (23) that divides into said cables (23a, 23b, 23c) appropriately arranged to provide remotely controlled functioning of said corresponding valves (24a, 24b, 24c) of each said buoyant member (4), said duct means (22a) being employed for supplying compressed air into said compressed air tank (22) and said pipe network (15) wherein flows said working fluid medium in which are imparted wave induced pressure pulses through said plurality of pumps (7, 14a, 14b, 17) are lined along sequential buoyant member said tubular shaft connecting means (5) and along said trilateral radial plank members (3), each trilateral radial plank member (3) being provided with a pair of fluid tanks (18), one of said pair of fluid tanks (18) being maintained at a relatively high pressure and the other one of said pair of fluid tanks (18) being maintained at a relatively low pressure, all relatively high pressure fluid tanks being interconnected in parallel and maintained at the same standard value of high pressure and all relatively low pressure fluid tanks being also interconnected in parallel and maintained at the same standard value of low pressure, pressure of the working fluid medium being thereby regulated as it is being pressed through said plurality of wave motion exploiting pumps (7, 14a, 14b, 17) of the wave energy collecting device.

10. Wave energy collecting device as claimed claim 1, characterised by the predetermined mutually different lengths of the diameter of each one of said buoyant members (4), the length of said tubular shaft connecting means (5) and the diameter of said repeatable module (1) of the wave energy collecting device, said predetermined mutually different lengths allowing for a relatively steady maximal wave energy converting efficiency obtained through advantageous exploitation of wavelengths varying in between the length of the diameter of each one of said buoyant members (4) and double the length of the diameter of said repeatable wave energy collecting module (1).

* * * * *